United States Patent
Dutta et al.

(10) Patent No.: US 7,000,189 B2
(45) Date of Patent: Feb. 14, 2006

(54) DYNAMIC DATA GENERATION SUITABLE FOR TALKING BROWSER

(75) Inventors: Rabindranath Dutta, Austin, TX (US); Richard Scott Schwerdtfeger, Round Rock, TX (US); Lawrence Frank Weiss, Austin, TX (US)

(73) Assignee: International Business Mahcines Corporation, Armonk, NY (US)

( * ) Notice: Subject to any disclaimer, the term of this patent is extended or adjusted under 35 U.S.C. 154(b) by 975 days.

(21) Appl. No.: 09/801,609

(22) Filed: Mar. 8, 2001

(65) Prior Publication Data

US 2002/0129100 A1 Sep. 12, 2002

(51) Int. Cl.
G06F 3/00 (2006.01)

(52) U.S. Cl. .................. 715/727; 715/738; 715/760; 715/501.1

(58) Field of Classification Search .............. 715/727, 715/729, 733, 738, 760, 764, 765, 865, 978; 345/727–729, 716, 733, 760, 764, 765, 865; 704/258, 260, 270, 271
See application file for complete search history.

(56) References Cited

U.S. PATENT DOCUMENTS

| | | | | |
|---|---|---|---|---|
| 5,748,186 A | * | 5/1998 | Raman | 715/500.1 |
| 5,899,975 A | * | 5/1999 | Nielsen | 704/270.1 |
| 5,953,392 A | * | 9/1999 | Rhie et al. | 379/88.13 |
| 5,987,504 A | * | 11/1999 | Toga | 709/206 |
| 5,991,781 A | * | 11/1999 | Nielsen | 715/513 |
| 6,023,714 A | * | 2/2000 | Hill et al. | 715/513 |
| 6,085,161 A | * | 7/2000 | MacKenty et al. | 704/270 |
| 6,088,675 A | * | 7/2000 | MacKenty et al. | 704/270 |
| 6,115,686 A | * | 9/2000 | Chung et al. | 704/260 |
| 6,311,215 B1 | * | 10/2001 | Bakshi et al. | 709/221 |
| 6,442,523 B1 | * | 8/2002 | Siegel | 704/270 |
| 6,664,974 B1 | * | 12/2003 | Lindstrom-Tamer | 345/619 |
| 6,665,642 B1 | * | 12/2003 | Kanevsky et al. | 704/260 |
| 6,697,781 B1 | * | 2/2004 | Sahlberg | 704/260 |
| 6,708,152 B1 | * | 3/2004 | Kivimaki | 704/260 |
| 6,728,763 B1 | * | 4/2004 | Chen | 709/219 |
| 6,728,934 B1 | * | 4/2004 | Scopes | 715/513 |
| 6,745,163 B1 | * | 6/2004 | Brocious et al. | 704/260 |
| 2002/0091738 A1 | * | 7/2002 | Rohrabaugh et al. | 707/517 |
| 2002/0178007 A1 | * | 11/2002 | Slotznick et al. | 704/270.1 |

* cited by examiner

Primary Examiner—John Cabeca
Assistant Examiner—Brian J. Detwiler
(74) Attorney, Agent, or Firm—Joseph P. Lally; Casimer K. Salys

(57) ABSTRACT

A system and method for transferring information a data processing network. A client device suitable for connecting to the network includes a client application configured to receive information from the network and to present the received information to a user as audio information. The server is configured to provide information to the client data processing device responsive to the client request. The system is configured to determine when at least a portion of the information provided by the server is unsuitable for presentation by the client and to respond to the determination by storing the information for later access by the user, presenting a visually enhanced version of the information to the user, or providing portions of the information suitable for audio presentation to the user.

13 Claims, 5 Drawing Sheets

DYNAMIC DATA GENERATION SUITABLE FOR TALKING BROWSER

BACKGROUND

1. Field of the Present Invention

The present invention generally relates to the field of data processing networks and more particularly to a system and method for dynamically generating suitable network information such as web pages or email messages when communicating with a talking browser.

2. History of Related Art

Consumer, business, and governmental use of the Internet have evolved rapidly and now encompass a wide variety of transactions. Consistent with this evolution, the manner in which web-based services and content are accessed has evolved as well. Whereas web content was historically requested by the user of a desktop computer or similar device connected to the Internet via a wire line connection, wireless web access through a wide variety of Internet enabled devices is now commonplace. Unfortunately, much of the content on the Internet including much of the commercial content is designed for presentation to a conventional client or web browser. Specifically, much web content assumes or requires that the user of the web browser is able to view the content at his or her leisure. An increasing number of visually impaired users, however, are now accessing the Internet through talking browsers and similar products. In addition, the advent of wireless web devices has resulted in a proliferation of users who are temporarily visually impaired because they are accessing the Internet while engaged in other activities, such as driving a vehicle, that required the users' full visual attention. Thus, the conventionally delivered web page requiring the user's sight and full attention may not be suitable for an increasing number of users. It would therefore be desirable to implement a system and method for delivering web content that accounted for the browser environment and browser type. More specifically, it would be desirable to implement a system and method that optimized web content for visually impaired users and took appropriate action when the requested content is not suitable for presentation to such users.

SUMMARY OF THE INVENTION

The problems identified above are addressed by a method and system according to the present invention in which web content is optimally provided to a visually impaired users. The system may include one or more web servers connected to a network such as the Internet. A client application, such as a talking browser, may be connected to the network via a wireless link. When the client application requests web content, a determination is made as to whether the user may be visually impaired and, if so, whether the requested content contains portions, such as input fields, that are not suitable for delivery and presentation to a visually impaired user. If the requested content contains unsuitable content and the unsuitable content is deemed to be essential, the requested web page (or other content) may be preserved for later viewing by dynamically generating a URL indicating where the page is stored and delivering the URL to the user (via email) or by emailing the requested web page directly to the user. This option may be suitable for users who are only temporarily visually impaired because they are engaged in other activities that temporarily prevent them from viewing the content. Alternatively, the requested web page may be delivered to the user in a modified format, such as a greatly magnified format, to facilitate viewing by users who are permanently but only partially visually impaired. If the unsuitable content is not considered essential, a dynamically generated version of the web page that excludes the unsuitable content may be sent to the browser. The browser may be a talking browser suitable for presenting web content in an audio format. In one embodiment, the system may include a proxy server intermediary between the browser and the web server for handling the determination of whether to deliver the requested content to the browser or whether to preserve the content for later viewing when the user is at a more conventional browser.

BRIEF DESCRIPTION OF THE DRAWINGS

Other objects and advantages of the invention will become apparent upon reading the following detailed description and upon reference to the accompanying drawings in which.

Figure 1:
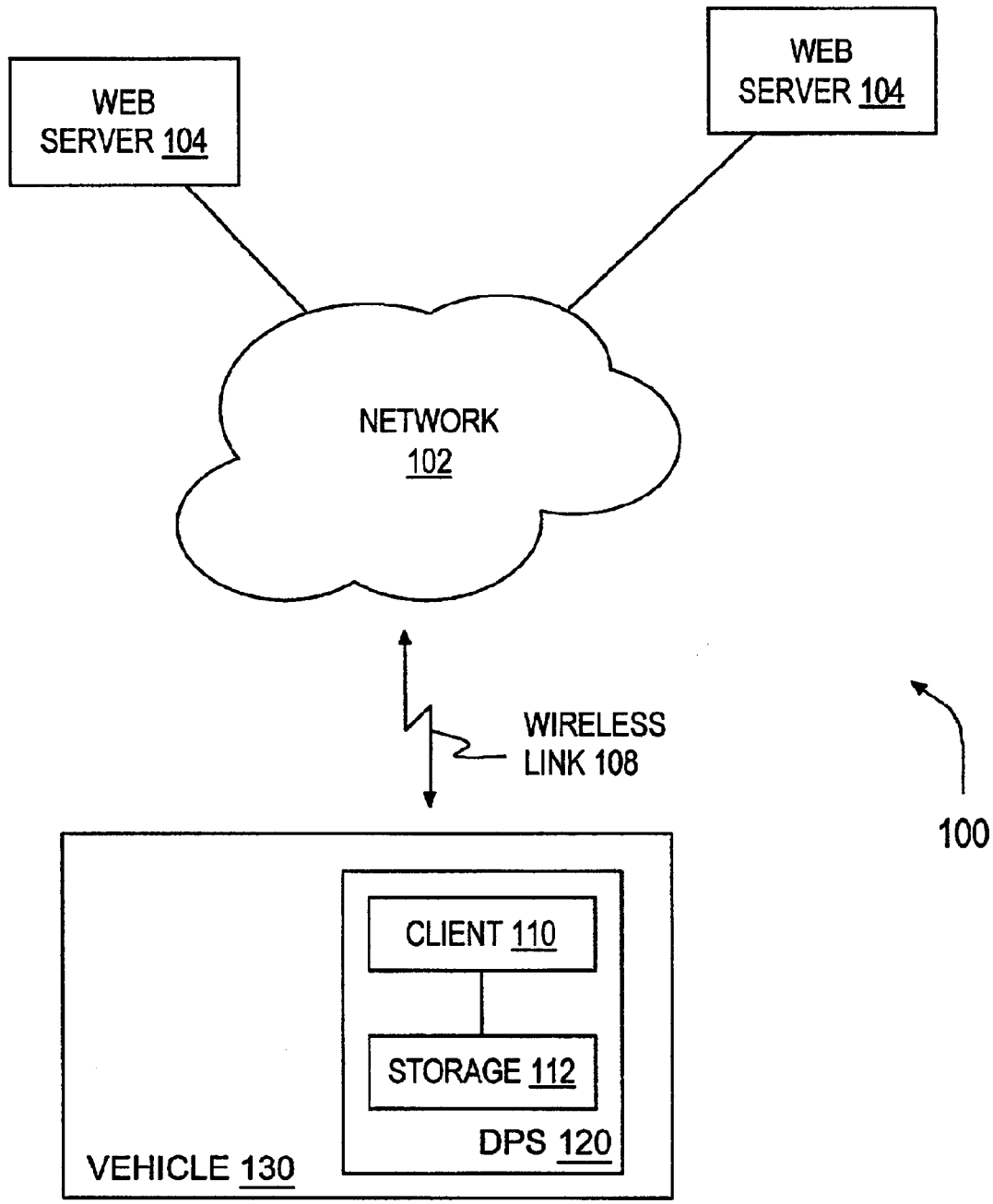
FIG. 1 is a block diagram of selected features of a system suitable for use with the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Turning now to the drawings, FIG. 1 is a block diagram of selected elements of a data processing system suitable for use with the present invention. In the depicted embodiment, system 100 includes one or more application servers illustrated as web servers 104 that are connected to a network 102. Network 102 typically includes a plurality of network devices such as hubs, routers, repeaters, and gateways designed to provide communications links between various data processing systems connected to the network. In an embodiment in which system 100 represents the Internet, network 102 includes a worldwide collection of networks and connection devices using various protocols to communicate with one another. These protocols may include the Lightweight Directory Access Protocol (LDAP), the Transport Control Protocol/Internet Protocol (TCP/IP) suite of protocols, the Hypertext Transport Protocol (HTTP), the Wireless Application Protocol (WAP), and other suitable communication protocols.

System 100 as depicted in FIG. 1 is enabled to communicate with a client application represented in FIG. 1 by reference numeral 110. In one embodiment, client 110 represents application software comprised of a sequence of computer executable instructions stored on a computer readable medium. Client 110 may be contained within the system memory of a data processing system 120. Data processing system 120 may represent any of a variety of familiar data processing devices including, as examples, a mainframe computer, personal or desktop computer, portable or laptop computer, personal digital assistant (PDA), or a network enabled phone. Thus, system 100 represents a heterogeneous network that may include additional servers, clients, routers, hubs, and other devices that are not explicitly shown in FIG. 1. System 100 may include a variety of network types including, as examples, one or more intranets, local area networks (LANs), and wide area networks (WANs).

Figure 2:
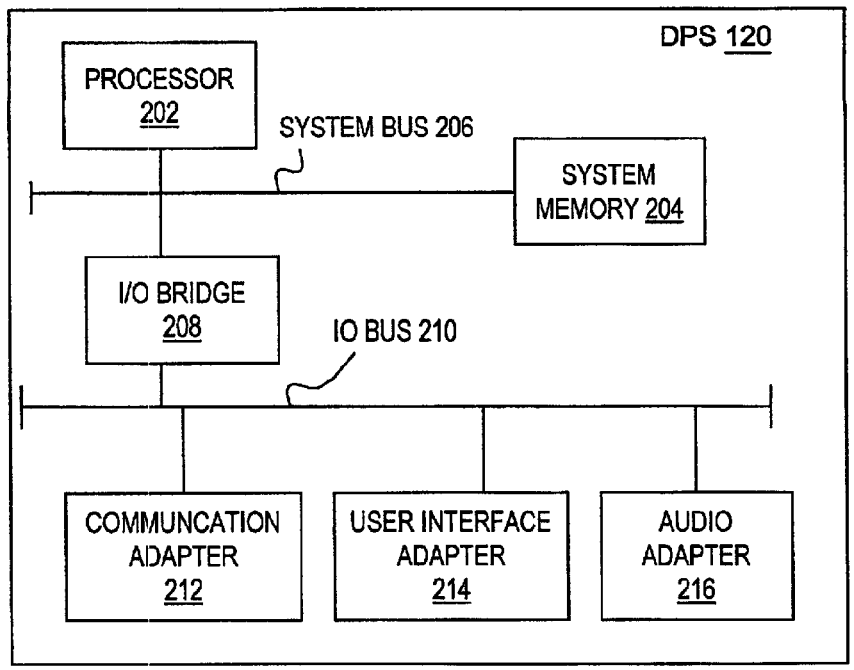
FIG. 2 is a block diagram of selected features of a data processing system suitable for use in the system of FIG. 1.

Referring now to FIG. 2, a block diagram illustrating selected elements of data processing system 120 is presented. In the depicted embodiment, data processing system 120 includes one or more processors 202 connected to a system memory 204 through a system bus 206. An I/O bridge 208 provides an interface between devices connected to system bus 206 and devices connected to an I/O bus 210. I/O bus 210 may comprise a legacy I/O bus such as PCI, ISA, AGP, or another suitable I/O bus architecture. In the depicted embodiment, data processing system 120 includes a communication adapter 212, a user interface adapter 214, and an audio adapter 216. Communication adapter 212 may enable data processing system 120 to communicate with the network 102 via a wireless link indicated in FIG. 1 by reference numeral 108. Additional peripheral devices not shown in FIG. 2 may be connected to I/O bus 210. These additional peripheral devices could include, as examples, a graphics or display adapter, a disk storage adapter, or a network adapter such as an Ethernet adapter.

Those skilled in the design of data processing systems will appreciate that the design of data processing system 120 may vary according to implementation. The processor(s) used for processor(s) 202 may be a RISC based microprocessor such as a PowerPC® processor from IBM Corporation. In other embodiments, the processor may comprise and x 86 type processor and/or a digital signal processor (DSP). Data processing system 120 may include a non-volatile memory device in addition to the system memory 204. Thus, the particular hardware for an embodiment in which data processing system 120 is implemented as a lap top computer would be different from the hardware found in an embodiment in which system 120 comprises a network-enabled or web-enabled phone or PDA. The depicted embodiment is not meant to imply hardware design limitations of data processing system 120.

Data processing system may also be implemented on various software platforms. Data processing system 120 typically operates under an operating system that supports one or more application programs. The operating system may be a Unix® derivative such as an AIX® operating system from IBM Corporation. Alternatively, data processing system 120 may implement a Java® runtime environment. Data processing system 120 as depicted in FIG. 1 includes a client application program (client) 110. In one embodiment, client 110 comprises a browser application that enables data processing system 120 to interact with application servers 104 that are connected to network 102. In an application in which network 102 represents the Internet, client 110 may represent any of a variety of web browsers. Web browsers are suitable for accessing hypertext documents in a variety of formats, such as Extensible Markup Language (XML), Hypertext Markup Language (HTML), Handheld device Markup Language (HDML), Wireless Markup Language (WML), and various other formats and types of files. In the preferred embodiment, system 100 is fully able to support a variety of peer-to-peer services in which users claim use the Internet to exchange files with each other directly or through a mediating server.

In a typical network capable of providing web-based services, client 110 may represent a browser application capable of displaying web pages retrieved from servers 104 using standardized web page addressing formats. Typically, client 110 may display various types of content in addition to web pages. Moreover, the location of the content may be represented with a variety of addresses, such as Uniform Resource Locators (URLs) and Uniform Resource Identifiers (URIs). Client 110 has access to local storage 112 of data processing system 120 where local storage 112 may represent system memory 204 or other storage such as any hard disk storage of system 120. Client 110 may use local storage 112 to store retrieved web pages, a book mark file, and other items.

In the embodiment depicted in FIG. 1, client 110 and data processing system 120 are located on a vehicle 130, which may represent an automobile, truck, or airplane. In this embodiment, client 110 communicates with network 102 via a wireless link 108. In this environment, the user of client 110 may be the driver of the vehicle and may be unable to interact with client 110 to the same extent as a home or office based user. More specifically, the driver of vehicle 130 may be a temporarily visually impaired user of client 110 since the user must continue to view the road or sky as he or she navigates the vehicle. In embodiments where data processing system 120 is not part of a vehicle, the user may be permanently visually impaired. To accommodate both temporarily and permanently visually impaired users, client 110 may be implemented as a talking browser designed to facilitate web interaction for the visually impaired. A talking browser is configured to receive standard web-based information such as HTML formatted content from a server such as web server 104 and is further configured to generate audibly detectable output based on the received information. Thus, a talking browser is designed to generate an audio version of a standard web page to enable visually impaired users to interact with the Internet and other suitable networks. The talking browser may also permit selective viewing of the requested content in a modified format suitable for users with low vision. Commercially available talking browsers include the Home Page Reader from IBM Corporation. The Home Page Reader is enabled to speak text, frames, image and text links, to alternate text for images and image maps, to form elements including JavaScript, graphics descriptions, text in column format, and data input fields and includes special table navigation features that allow a visually impaired user to understand even complex tables, such as television listings.

The present invention contemplates facilitating web-based interaction for temporarily and permanently visually impaired users. In one embodiment, the invention includes the dynamic generation of web pages or other suitable content based upon the type of browser being used. If the browser is, identified as a talking browser, for example, the content generated is modified to exclude or minimize any onerous input requirements so that the visually impaired user is not required to devote significant visual attention to the browser. If the particular retrieved web page contains input content that is considered essential, the content may be stored and retrieved by a temporarily impaired user at a later time. In this manner, drivers of vehicles are able to interact with the Internet without placing themselves at greater risk of becoming involved in an accident. Alternatively the invention may permit selective viewing of the retrieved web page in a modified format suitable for permanently impaired users with low vision. In this embodiment, the modified web page could include, for example, a larger font size and high contrast colors.

Figure 3:
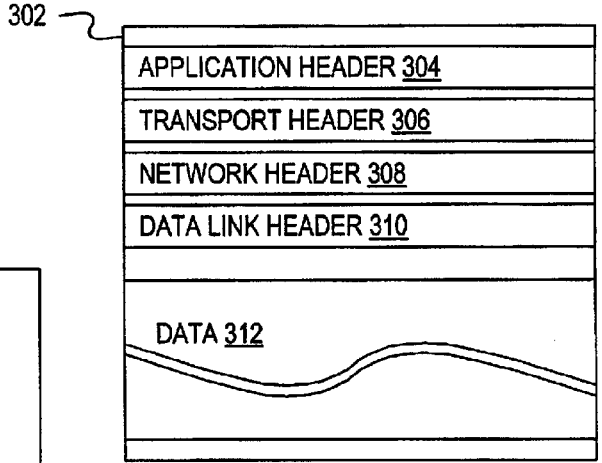
FIG. 3 is a conceptual representation of an information packet.
Figure 4:
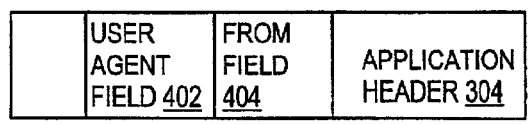
FIG. 4 is a conceptual representation illustrating greater detail of the information packet of FIG. 3.

Referring now to FIG. 3 and FIG. 4, conceptualized representations of information exchanged between client 110 and web server 104 are presented. In a typical embodiment of system 100, information is transmitted over network 102 in fragments or packets that are formatted according to one or more predetermined communication protocols. Communication protocols may specify various "layers" of formatting, each of which is applied to the basic data of a packet. Commonly encountered communication protocols frequently follow, at least to some extent, the seven layer communication protocol stack described in the Open Systems Interconnect (OSI) reference model published by the International Standards Organization. Each layer of the reference model defines a function or related group of functions that occur at each end of the communication. FIG. 3 is a conceptualized representation of a packet 302 that is transmitted across network 102 of system 100. The depicted packet 302 is compliant with the Transport Communication Protocol/Internet Protocol (TCP/IP) suite of protocols, which provide the foundation and framework for many computer networks including the Internet. TCP/IP is extensively documented in a variety of publications including M. Murhammer et al., *TCP/IP Tutorial and Technical Overview*, available online at www.redbooks.ibm.com (#GG24-3376-05) and incorporated by reference herein.

A TCP/IP packet includes various headers where each header corresponds to a layer of the communication protocol stack. TCP/IP packet 302 typically includes an application header 304, a transport header 306, a network header 308, and a data link header 310. In one embodiment, application header 304 is an HTTP compliant header that includes information, referred to herein as user agent information, that identifies the particular browser application running on client 110. FIG. 4 illustrates a user agent field 402 as part of the HTTP application header 304. In addition, application header 304 typically further includes information indicating an address associated with the user who sent the packet. In the depicted embodiment, for example, application header 304 includes a "from" field that may contain the email address of the user. Packets of the type depicted in FIG. 3 and FIG. 4 may be generated in response to a user request to access a web page. When a user attempts to access a particular web page, such as by entering (or speaking) the URL of the desired web page, client 110 may generate an appropriate command such as a GET request that includes an application header 304 containing a user agent field 402 and a from field 404.

Figure 5:
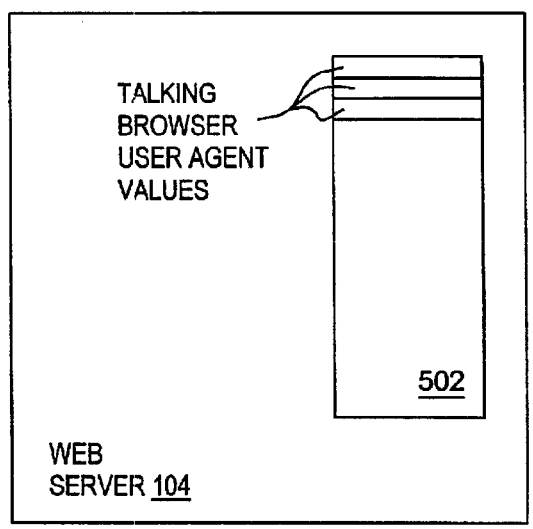
FIG. 5 is a representation of a web server according to one embodiment of the invention and suitable for use in the system of FIG. 1.

One embodiment of the invention contemplates web servers 104 (also referred to as application servers) that are configured to determine when a request for content is initiated by a talking browser. Upon detecting a request from a talking browser, the web server may then modify the content of the response to exclude content not suitable for presentation to a talking browser. Web servers 104 may determine whether the client originating a particular request is a talking browser by retrieving user agent information from the user agent field of the received request. The retrieved user agent information may then be compared against a list of talking browser user agent values. As depicted in FIG. 5, a list 502 of user agent values may be stored in local storage of web server 104 (or on a centralized storage facility accessible to web server 104). If web server 104 detects a match between the user agent value of a request for content and a user agent value in the list 502 of user agent values, web server 104 may selectively generate responsive content that is audibly detectable or visually enhanced. Thus, web server 104 is configured to generate web content dynamically based in part on the type of browser originating the request.

When the web server 104 determines that a request for content originated from a visually impaired user, web server 104 is enabled to produce responsive web content that is substantially free of user input requirements. In this manner, talking browser clients 110 are better able to relay the provided content to the user. Thus, one embodiment of the invention includes a web server 104 that is configured to respond to a request from a visually impaired user by dynamically generating web content that excludes burdensome input requirements. If user input is an essential requirement of the requested content, web server 104 may provide the user with the option of requesting the web server to push a copy of the web page (including the input requirements) to the user. Consider, as an example, a user who retrieves a web page that includes a form for purchasing an item or service. The form includes fields, such as name, address, credit card information, etc., requiring input from the user. In this case, providing the content without the input fields is of little value to the user. Instead, web server 104 may be configured not only to detect when a request is initiated by a visually impaired user, but also to determine that the requested content includes input requirements that are an essential feature of the content. In this case, web server 104 may respond to the user by stating that the requested web page includes content not suitable for presentation on a talking browser and requesting the user to indicate with a simple response (yes/no) whether the user wishes the web server to preserve a copy of the web page for the user. If the user responds to this query with a yes response, web server 104 preserves a copy of the content for later viewing by the user, such as when the user has stopped the vehicle 130. Web server 104 may also present the user with the option of receiving the requested content in a visually enhanced format suitable for permanently impaired users who have low vision. The visually enhanced content may include large font sizes and high contrast colors.

In one embodiment, web server 104 preserves requested content by retrieving the email address of the user from the application header of the GET request (or other packet that initiated the retrieval of web information). Web server 104 may then email the retrieved web content to the user as an attached HTML file, where the user can retrieve it at a later time. Alternatively, web server 104 may store the appropriate web page content and assign a dynamically generated URL to the stored copy of the web page. The URL of the requested web page may then be emailed to the user. In this embodiment, the specially created URL can be embedded as a hyperlink in this email message. In either case, the user can retrieve the web page content at a more convenient time, such as when the user arrives at work or home and has access to a conventional desktop or laptop personal computer. In another embodiment, web server 104 may bypass the yes/no request and automatically email the client with a preserved copy of the web page or email the client with a dynamic URL from which the user can retrieve the content.

Figure 6:
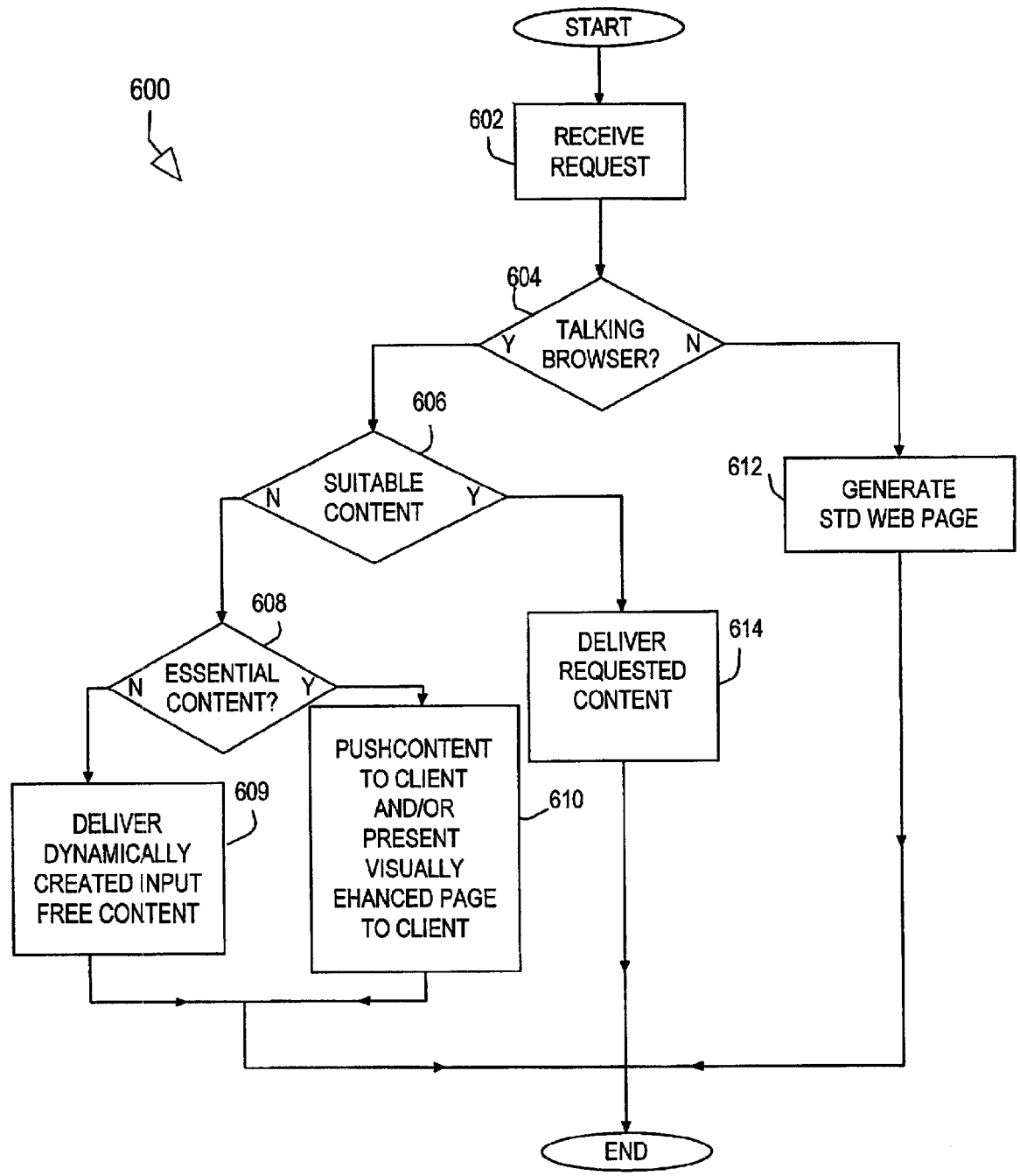
FIG. 6 is a flow diagram of a method of providing web-based content according to one embodiment of the invention.

Referring now to FIG. 6, a flow diagram illustrating a method 600 of generating web content according to one embodiment of the present invention is described. In the depicted embodiment, a request such as a GET request from a client application is received (block 602) by a web server. The request typically includes an address, such as an email address, associated with the user of the client and an identifier of the client application. The web server may then determine (block 604) whether the user is visually impaired such as by determining whether the client application is a talking browser. This determination may be made by comparing the information in a user agent field of the request against a list of predetermined talking browser user agent identifiers that may be stored in the web server's storage.

If the web server determines that the request originated from a talking browser, the server may then determine (block 606) whether the requested web page or other content is suitable for presentation to a talking browser. The web server may deem the requested content unsuitable for a talking browser if, for example, the requested content includes onerous input requirements that would divert the attention of the user from other tasks such as driving a vehicle in which the client application is installed. If the web server determines that the requested content is substantially suitable for presentation to a talking browser, the request is serviced (block 614) in a conventional manner by delivering the requested content to the talking browser, which then conveys the content to the user as audio content.

If the web server determines in block 606 that the content requested by the client application is not suitable for delivery to a client application, the server then determines (block 608) whether the non-suitable content is essential to the web page. This determination may be achieved by determining if the requested content would require user input more complex than, for example, a single key stroke, a single spoken command, or a single click of a pointing device. If the requested content does contain essential content that is not suitable for a talking browser, the server may then preserve the requested content for later viewing by the user and/or present the requested content to the user in a visually enhanced format. In one embodiment, the requested content may be preserved by pushing (block 610) the requested content (the requested web page) to the user's email address. Alternatively, the web server may dynamically generate a URL for the requested page and email the dynamically created URL to the user's email address. The server may push the requested content to the user either automatically or upon presenting the user with a yes/no type query and receiving a positive response. Similarly the selective viewing of the enhanced visual format of the requested web page may occur automatically or upon appropriate response from the user.

If the web server determines in block 608 that the content deemed unsuitable for presentation to a talking browser is not essential content, the web server may dynamically generate a web page that excludes the unsuitable talking browser content and deliver (block 609) the dynamically generated page to the client application. Finally, if the web server determines in block 604 that the requesting browser is not a talking browser, the server generates (block 612) a standard web page in the conventional manner. Thus, the web server in this embodiment is configured to determine the browser type upon receiving a request and to generate content that is appropriate for the requesting browser type. If the browser type is incompatible with the requested content, the server can accommodate the browser either by delivering a modified version of the requested page that excludes all incompatible content, by delivering a visually enhanced version of the requested content to the user, or by preserving the requested page and pushing it out to the user for viewing at a later time.

Figure 7:
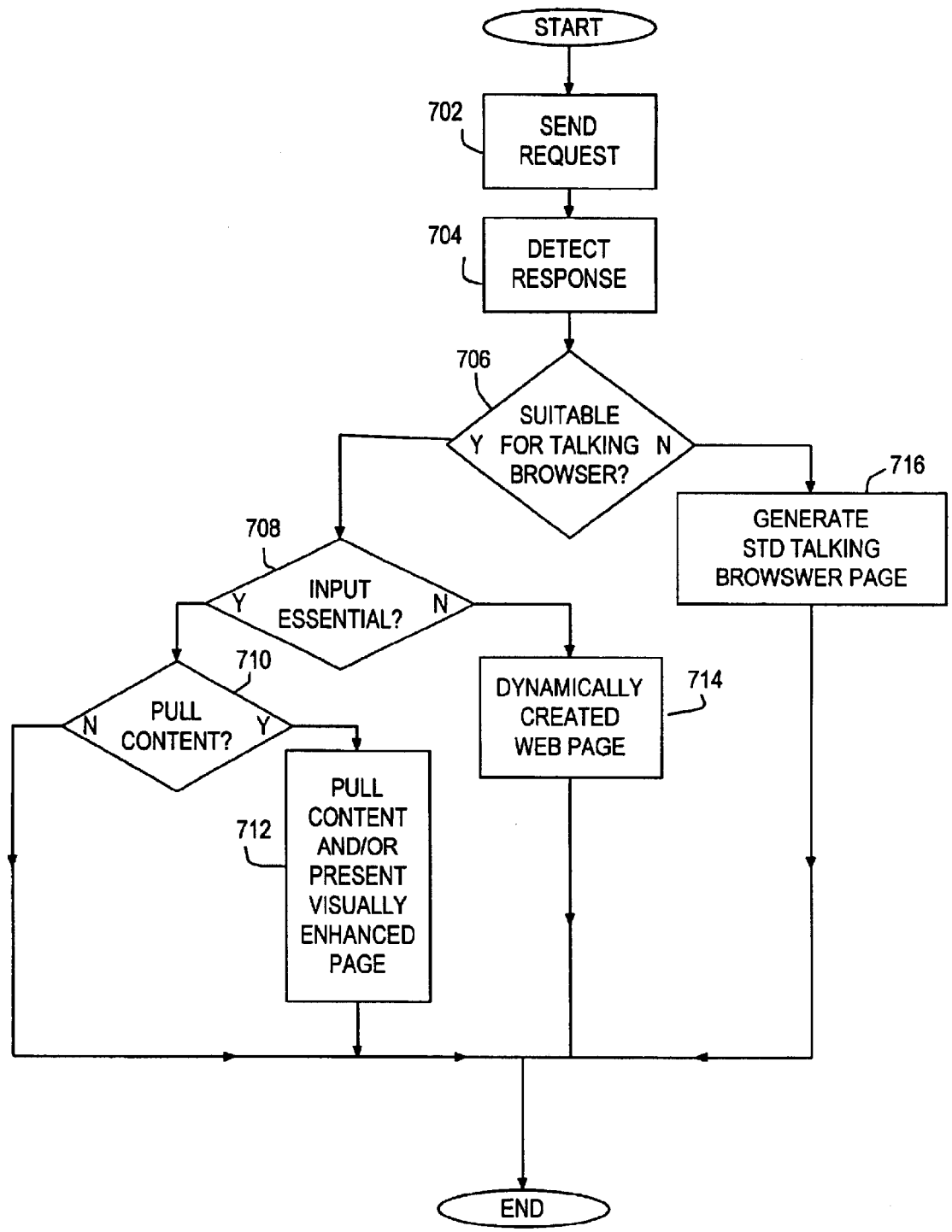
FIG. 7 is a flow diagram of a method of retrieving web based content according to one embodiment of the invention.

The method described above with respect to FIG. 6 requires specially implemented web servers. Because there is an enormous installed base of servers, however, it may well be unrealistic to anticipate that all existing web servers have been revised to incorporate the browser specific behavior described herein. Referring now to FIG. 7, a flow chart depicting an embodiment of the invention is described in which the talking browser itself determines whether content received from a web server is appropriate for a talking browser. Initially, the talking browser generates a request, typically in response to input from the user, and sends (block 702) the request. Presumably, the request is ultimately delivered to the appropriate web server, where the requested content (web page for example) is retrieved and sent back to the client. The client then detects (block 704) the delivery of the requested content and determines (block 706) whether the content is suitable for a talking browser. In one embodiment, the determination of whether requested content is suitable for a talking browser includes determining whether the requested content contains any input fields such as drop down boxes, text boxes, etc. If the requested content is suitable for delivery to a talking browser, the client simply presents (block 716) the content to the user as audio content.

If the client determines that the requested content contains content that is not suitable for the client, the client may then determine (block 708) whether the unsuitable content is essential content. Differing levels of intelligence may be incorporated into the client to determine whether a particular web page contains essential unsuitable content. In one embodiment, the client may simply conclude that any input fields in the requested content are essential fields. In other embodiments, the client may employ various algorithms to determine whether a particular input field is considered essential.

If the unsuitable content of the requested page is ultimately found by the client to be nonessential, the browser may then dynamically generate (block 714) a modified web page that excludes the content requiring user input and deliver the modified web page to the user as audio content. If the unsuitable portion of the requested content is deemed in block 708 to be essential, the client may then prompt the user to determine (block 710) whether the user would like the browser to pull the content from the server for viewing at a later time on a conventional browser and/or view a visually enhanced version of the requested content. If the user enters an appropriate response, the client may then preserve the requested content by delivering the requested content to the user via email or by storing (either locally or on the server) the requested content under a dynamically assigned URL and sending the URL to the user via email. In another embodiment, the client may omit the user prompt and automatically preserve the requested content for later viewing. The browser may also present the requested web page to the user in a visually enhanced format suitable for permanently visually impaired users with low vision.

Figure 8:
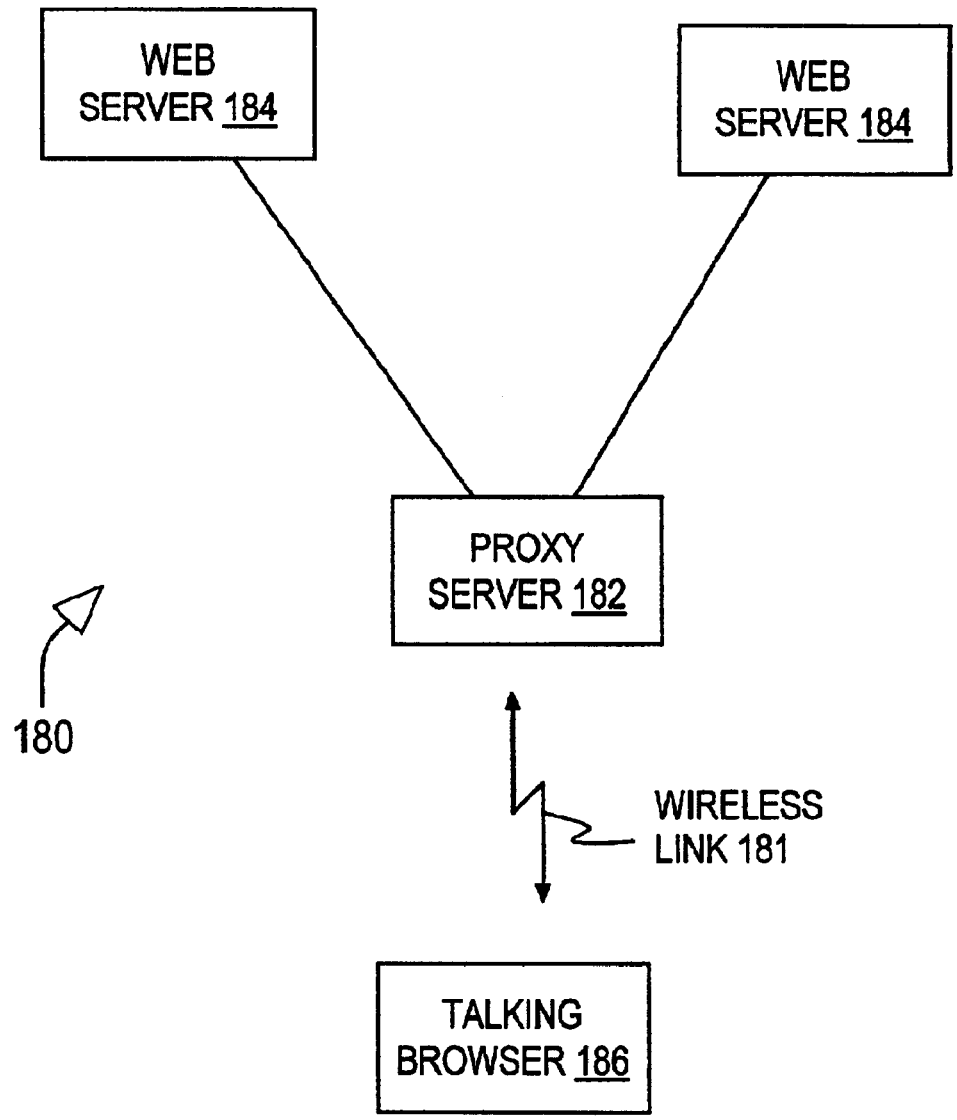
FIG. 8 is a block diagram of a system according to one embodiment of the invention emphasizing a proxy server as an intermediate between a web server and a talking browser.

Much as the method described in reference to FIG. 6 requires modification of the web server, the method described in reference to FIG. 7 requires modification of the browser. It may be desirable to implement a system and method in which neither the server nor the browser require special modification to achieve the desired result for users of talking browsers. Referring now to FIG. 8, a block diagram of selected features of a system 180 suitable for achieving the dynamic modification of web content based on the browser type of the requesting browser is described. System 180 includes one or more web servers 184, which are analogous to web servers 104 of FIG. 1. Web servers 184 are connected, either directly or through intermediate networking devices such as gateways, routers, hubs, etc., to a proxy server 182. Proxy server 182 itself is networked through wireless link 181 to a talking browser 186 that may be located within an automobile or other vehicle. Thus, proxy server 182 serves as an intermediary server between browser 186 and the desired web content on web servers 184. The user of talking browser 186 may require a user account to access proxy server 182. In this embodiment, proxy server 182 may represent an Internet service provide (ISP) that offers enhanced web content and proprietary web services to its users.

In one embodiment, requests for content initiated by browser 186 are received by proxy server 182. Proxy server 182 then forwards the request to web servers 184. The appropriate web server 184 then returns the requested content to proxy server 182, where it is ultimately forwarded to talking browser 186. In one embodiment, proxy server 182 is configured to determine that browser 186 is a talking browser such as by inspecting the user agent field of a web content request initiated by browser 186. Proxy server 182 may also be designed to determine whether content provided by web server 184 is suitable for presentation to a talking browser and for taking appropriate action if the content is not suitable. Specifically, proxy server 182 may be configured to store locally or otherwise preserve the requested content upon determining that it is not suitable for presentation to talking browser 186.

Proxy server 182 may be further configured to deliver an appropriate message to talking browser 186 upon making such a determination. The message may inform the talking browser user that the requested content cannot be delivered to a talking browser and that the requested content has been preserved for later viewing. Proxy server 182 could deliver an email message to the user of talking browser 186 containing a link to the preserved copy of the requested content. The link may consist of a URL that is dynamically generated by proxy server 182 upon determining that the requested content is not suitable for the talking browser.

Thus, by incorporating a proxy server 182 that is responsible for converting requested content to a format suitable for delivery to a specialized browser type and for taking appropriate action when the conversion is not feasible, the embodiment of the invention depicted in FIG. 8 relieves the end user and end provider from making significant software modifications. Proxy server 182 may store user specific preferences that inform proxy server 182 how to proceed when unsuitable content is requested from a talking browser. The preferences could specify, for example, that the user desires to receive an email version of any content that is non appropriate for a talking browser.

It will be apparent to those skilled in the art having the benefit of this disclosure that the present invention contemplates a system and method for implementing talking browsers in a network environment. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A client device comprising processing means and storage, wherein the client device is suitable for connecting to a network and includes a client application configured to generate a client request, receive information from the network, and present the received information to a user as audio information; and a server device connected to the network and configured to provide information to the client device responsive to the client request;

wherein the system is configured to determine when at least a portion of the information provided by the server is unsuitable for presentation to the user as audio information by the client and wherein the system is further configured to respond to the determination by storing the unsuitable portion of the information for subsequent access by the user;

wherein storing the information for later access by the user comprises assigning a dynamically generated URL to the stored informaton, creating a link indicating the dynamically generated URL, and emailing the link to the user.

2. The system of claim 1, wherein the client comprises a talking browser configured to convert Hypertext Markup Language (HTML) information to audio information.

3. The system of claim 1, wherein determining that the information provided by the server is unsuitable includes determining that the request was initiated by a talking browser by comparing a user agent field of the request against a list of talking browser user agent fields.

4. The system of claim 1, further comprising a proxy server intermediate between the server, wherein the proxy server determines that the requested information is unsuitable for presentation to the client.

5. The system of claim 1, wherein the client data processing device communicates with the network via a wireless link.

6. The system of claim 5, wherein the client data processing device is located on a vehicle.

7. The system of claim 1, wherein storing the information for later access comprises emailing the retrieved information to the user.

8. A computer program product residing on a computer useable medium for transferring information from a server to a client on a data processing network, comprising:

computer code means for determining when at least a portion of information requested by the client is unsuitable for presentation by the client; and computer code means, responsive to determining that the requested information includes information unsuitable for audio presentation, for taking an action selected from the group consisting of storing the requested information for subsequent retrieval by the user and providing a visually enhanced version of the requested information to the user;

wherein the code means for storing the requested information comprises code means for dynamically generating a URL indicative of a storage location of the requested information, code means for creating a link indicating the dynamically generated URL, and code means for forwarding the link to the user.

9. The computer program product of claim 8, wherein the code means for determining that information requested by the client is unsuitable for presentation by the client includes code means for determining that the request was initiated by a talking browser.

10. The computer program product of claim 9, wherein the code means includes code for determining that the request was initiated by a talking browser comprises means for comparing a user agent field of the request against a list of known talking browser user agent fields.

11. The computer program product of claim 8, wherein the code means for forwarding the link to the user comprises code means for sending the link to the user as an email message.

12. The computer program product of claim 8, wherein the code means for storing the information includes code means for forwarding the requested information to the user as an email message.

13. The computer program product of claim 8, further comprising code means for requesting the user whether the user wishes to store the requested information.

* * * * *

UNITED STATES PATENT AND TRADEMARK OFFICE
CERTIFICATE OF CORRECTION

PATENT NO. : 7,000,189 B2  Page 1 of 1
APPLICATION NO. : 09/801609
DATED : February 14, 2006
INVENTOR(S) : Rabindranath Dutta, Richard Scott Schwerdtfeger and Lawrence Frank Weiss It is certified that error appears in the above-identified patent and that said Letters Patent is hereby corrected as shown below:

On the title page:

(73) Assignee: International Business Machines Corporation, Armonk, NY (US)

Signed and Sealed this

Tenth Day of October, 2006

JON W. DUDAS
*Director of the United States Patent and Trademark Office*